(12) United States Patent
Dai et al.

(10) Patent No.: US 12,328,618 B2
(45) Date of Patent: Jun. 10, 2025

(54) USER EQUIPMENT CAPABILITY FOR WIRELESS SENSING

(71) Applicant: QUALCOMM Incorporated, San Diego, CA (US)

(72) Inventors: Jing Dai, Beijing (CN); Yuwei Ren, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 17/995,188

(22) PCT Filed: May 27, 2020

(86) PCT No.: PCT/CN2020/092467
§ 371 (c)(1),
(2) Date: Sep. 30, 2022

(87) PCT Pub. No.: WO2021/237486
PCT Pub. Date: Dec. 2, 2021

(65) Prior Publication Data
US 2023/0141170 A1    May 11, 2023

(51) Int. Cl.
*H04W 28/02* (2009.01)
*H04L 5/00* (2006.01)
(Continued)

(52) U.S. Cl.
CPC ....... *H04W 28/0215* (2013.01); *H04L 5/0007* (2013.01); *H04L 5/0048* (2013.01); *H04W 48/16* (2013.01); *H04W 76/28* (2018.02)

(58) Field of Classification Search
CPC . H04W 28/0215; H04W 48/16; H04W 76/28; H04L 5/0007
See application file for complete search history.

(56) References Cited

U.S. PATENT DOCUMENTS 12,078,709 B2 *   9/2024   Park ................... H04W 52/146

FOREIGN PATENT DOCUMENTS

| CN | 103154765 A | 6/2013 |
| EP | 2606372 B1 | 3/2018 |
| WO | WO-2019032010 A1 | 2/2019 |

OTHER PUBLICATIONS

International Search Report and Written Opinion—PCT/CN2020/092467—ISA/EPO—Feb. 20, 2021.

* cited by examiner

*Primary Examiner* — Diane D Mizrahi
(74) *Attorney, Agent, or Firm* — Harrity & Harrity, LLP

(57) ABSTRACT

Various aspects of the present disclosure generally relate to wireless communication. In some aspects, a user equipment may receive, by the user equipment, a request for capability information associated with a wireless sensing operation, the capability information identifying at least one of: whether the user equipment is capable of the wireless sensing operation, a sensing mode associated with time division duplexing multiplexing for the wireless sensing operation, a waveform for a signal associated with the wireless sensing operation, a sensing granularity associated with the wireless sensing operation, a range associated with the wireless sensing operation, a sensing bandwidth associated with the wireless sensing operation, a power control parameter associated with the wireless sensing operation, or a hardware constraint associated with the wireless sensing operation; and transmit, based at least in part on the request, the capability information. Numerous other aspects are provided.

35 Claims, 10 Drawing Sheets

(51) Int. Cl.
*H04W 48/16* (2009.01)
*H04W 76/28* (2018.01)

| Unit | Index 1 | Index 2 | Index 3 |
|---|---|---|---|
| Distance range | 4cm to 100 cm | 4cm to 1000 cm | 20cm to 1000 cm |
| Doppler range | 0.1cm/s to 0.3cm/s | 0.1cm/s to 5cm/s | 1cm/s to 10cm/s |
| Elevation angle range | [-90,90] | [-45,45] | [-0,90] |
| Azimuth angle range | [-90,90] | [-180,180] | [-45,45] |

FIG. 8

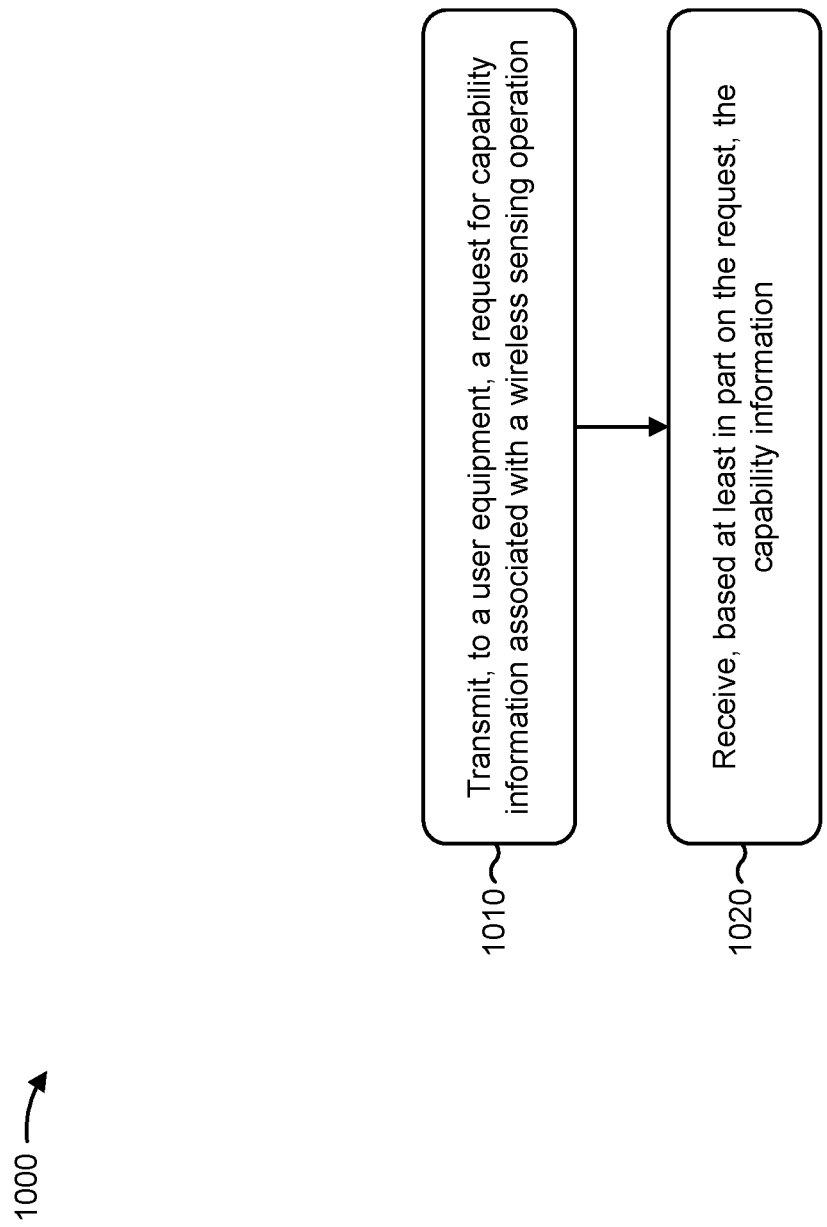

USER EQUIPMENT CAPABILITY FOR WIRELESS SENSING

CROSS-REFERENCE TO RELATED APPLICATION

This Patent Application is a 371 national stage of PCT Application No. PCT/CN2020/092467 filed on May 27, 2020, entitled "USER EQUIPMENT CAPABILITY FOR WIRELESS SENSING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a user equipment (UE) capability for wireless sensing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment for wireless communication may include a memory and one or more processors operatively coupled to the memory. The memory and the one or more processors may be configured to receive, by the user equipment, a request for capability information associated with a wireless sensing operation, the capability information identifying at least one of: whether the user equipment is capable of the wireless sensing operation, a sensing mode associated with time division duplexing (TDD) multiplexing for the wireless sensing operation, a waveform for a signal associated with the wireless sensing operation, a sensing granularity associated with the wireless sensing operation, a range associated with the wireless sensing operation, a sensing bandwidth associated with the wireless sensing operation, a power control parameter associated with the wireless sensing operation, or a hardware constraint associated with the wireless sensing operation; and transmit, based at least in part on the request, the capability information.

In some aspects, a base station for wireless communication may include a memory and one or more processors operatively coupled to the memory. The memory and the one or more processors may be configured to transmit, to a user equipment, a request for capability information associated with a wireless sensing operation, the capability information identifying at least one of: whether the user equipment is capable of the wireless sensing operation, a sensing mode associated with TDD multiplexing for the wireless sensing operation, a waveform for a signal associated with the wireless sensing operation, a sensing granularity associated with the wireless sensing operation, a range associated with the wireless sensing operation, a sensing bandwidth associated with the wireless sensing operation, a power control parameter associated with the wireless sensing operation, or a hardware constraint associated with the wireless sensing operation; and receive, based at least in part on the request, the capability information.

In some aspects, a method of wireless communication, performed by a user equipment, may include receiving, by the user equipment, a request for capability information associated with a wireless sensing operation, the capability information identifying at least one of: whether the user equipment is capable of the wireless sensing operation, a sensing mode associated with TDD multiplexing for the wireless sensing operation, a waveform for a signal associated with the wireless sensing operation, a sensing granularity associated with the wireless sensing operation, a range associated with the wireless sensing operation, a sensing bandwidth associated with the wireless sensing operation, a power control parameter associated with the wireless sensing operation, or a hardware constraint associated with the wireless sensing operation; and transmitting, based at least in part on the request, the capability information.

In some aspects, a method of wireless communication, performed by a base station, may include transmitting, to a user equipment, a request for capability information associated with a wireless sensing operation, the capability information identifying at least one of: whether the user equipment is capable of the wireless sensing operation, a sensing mode associated with TDD multiplexing for the wireless sensing operation, a waveform for a signal associated with the wireless sensing operation, a sensing granularity associated with the wireless sensing operation, a range associated with the wireless sensing operation, a sensing bandwidth associated with the wireless sensing operation, a power control parameter associated with the wireless sensing operation, or a hardware constraint associated with the wireless sensing operation; and receiving, based at least in part on the request, the capability information.

In some aspects, a non-transitory computer-readable medium may store one or more instructions for wireless communication. The one or more instructions, when executed by one or more processors of a user equipment, may cause the one or more processors to receive, by the user equipment, a request for capability information associated with a wireless sensing operation, the capability information identifying at least one of: whether the user equipment is capable of the wireless sensing operation, a sensing mode associated with TDD multiplexing for the wireless sensing operation, a waveform for a signal associated with the wireless sensing operation, a sensing granularity associated with the wireless sensing operation, a range associated with the wireless sensing operation, a sensing bandwidth associated with the wireless sensing operation, a power control parameter associated with the wireless sensing operation, or a hardware constraint associated with the wireless sensing operation; and transmit, based at least in part on the request, the capability information.

In some aspects, a non-transitory computer-readable medium may store one or more instructions for wireless communication. The one or more instructions, when executed by one or more processors of a UE, may cause the one or more processors to transmit, to a user equipment, a request for capability information associated with a wireless sensing operation, the capability information identifying at least one of: whether the user equipment is capable of the wireless sensing operation, a sensing mode associated with TDD multiplexing for the wireless sensing operation, a waveform for a signal associated with the wireless sensing operation, a sensing granularity associated with the wireless sensing operation, a range associated with the wireless sensing operation, a sensing bandwidth associated with the wireless sensing operation, a power control parameter associated with the wireless sensing operation, or a hardware constraint associated with the wireless sensing operation; and receive, based at least in part on the request, the capability information.

In some aspects, an apparatus for wireless communication may include means for receiving, by the user equipment, a request for capability information associated with a wireless sensing operation, the capability information identifying at least one of: whether the user equipment is capable of the wireless sensing operation, a sensing mode associated with TDD multiplexing for the wireless sensing operation, a waveform for a signal associated with the wireless sensing operation, a sensing granularity associated with the wireless sensing operation, a range associated with the wireless sensing operation, a sensing bandwidth associated with the wireless sensing operation, a power control parameter associated with the wireless sensing operation, or a hardware constraint associated with the wireless sensing operation; and means for transmitting, based at least in part on the request, the capability information.

In some aspects, an apparatus for wireless communication may include means for transmitting, to a user equipment, a request for capability information associated with a wireless sensing operation, the capability information identifying at least one of: whether the user equipment is capable of the wireless sensing operation, a sensing mode associated with TDD multiplexing for the wireless sensing operation, a waveform for a signal associated with the wireless sensing operation, a sensing granularity associated with the wireless sensing operation, a range associated with the wireless sensing operation, a sensing bandwidth associated with the wireless sensing operation, a power control parameter associated with the wireless sensing operation, or a hardware constraint associated with the wireless sensing operation; and means for receiving, based at least in part on the request, the capability information.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example of a table indicating values for a wireless sensing capability relating to a range for a wireless sensing operation, in accordance with various aspects of the present disclosure.

FIGS. 9-10 are diagrams illustrating example processes associated with signaling capability information for a wireless sensing operation, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
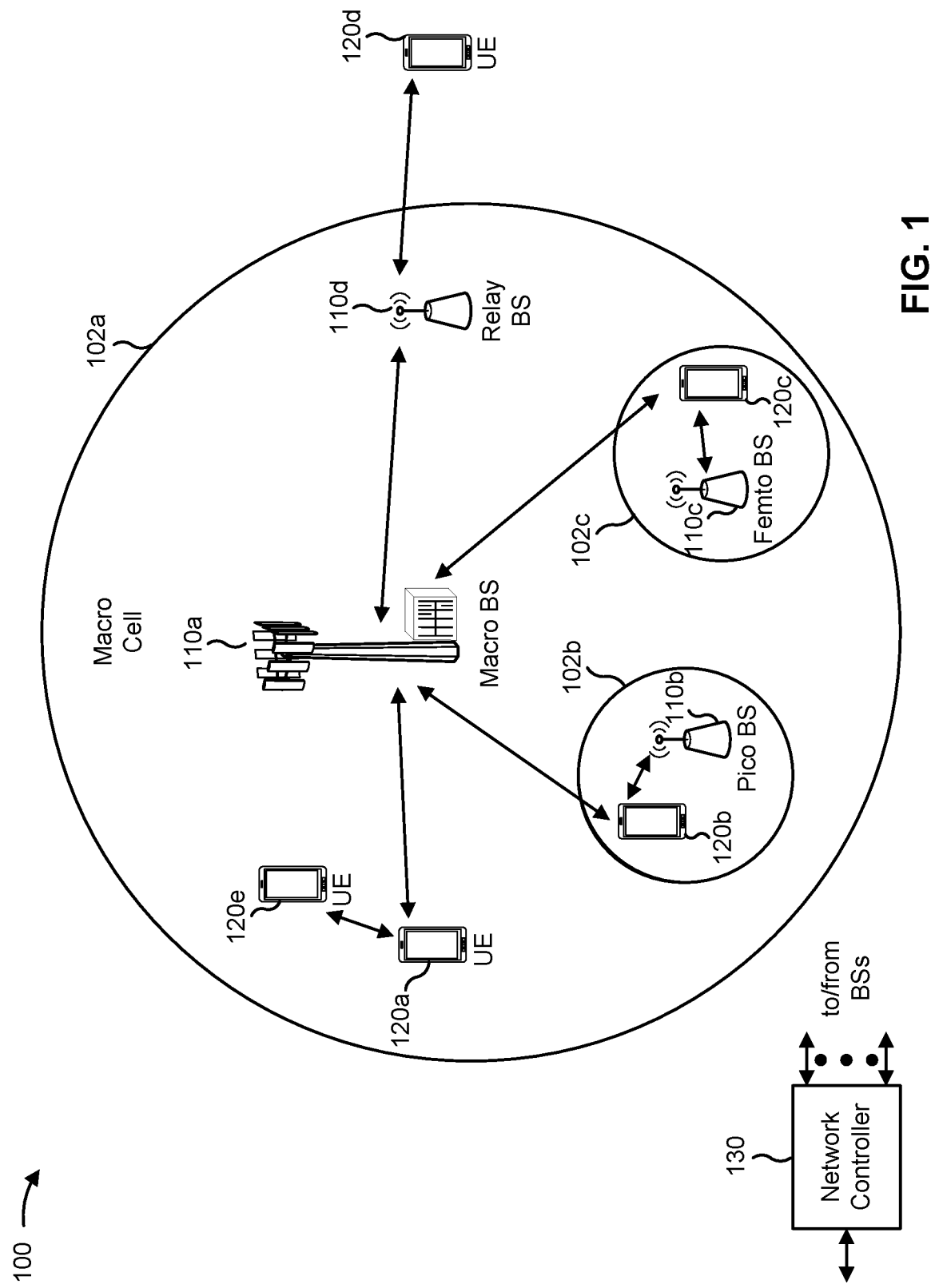
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
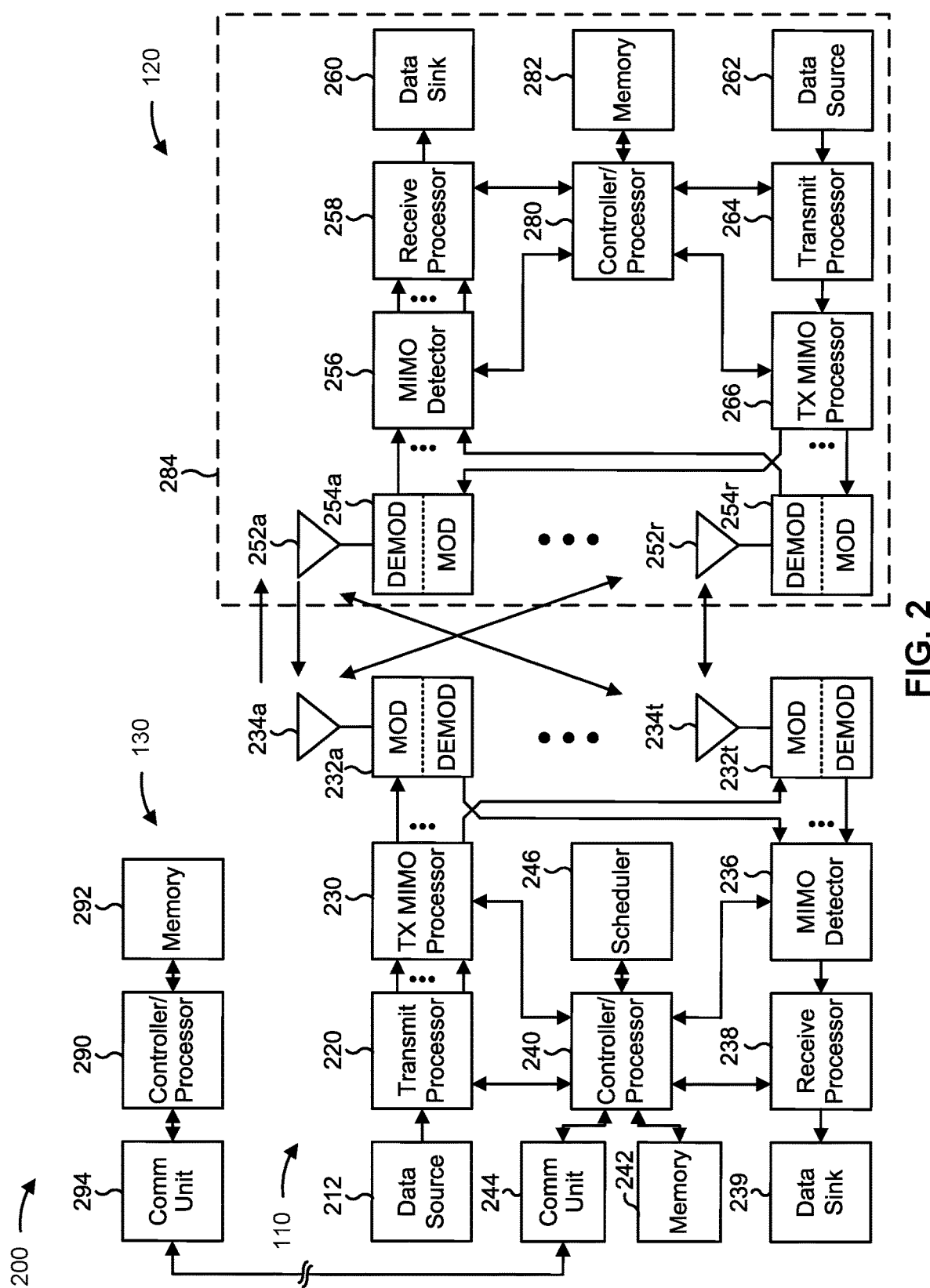
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-10.

Controller/processor 240 of base station 110, controller/processor 280 of UE 120, and/or any other component(s) of FIG. 2 may perform one or more techniques associated with UE capability signaling for a wireless signaling operation, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, interpreting the instructions, and/or the like.

In some aspects, UE 120 may include means for receiving a request for capability information associated with a wireless sensing operation; means for transmitting, based at least in part on the request, the capability information; means for performing the wireless sensing operation based at least in part on the capability information and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a user equipment, a request for capability information associated with a wireless sensing operation; means for receiving, based at least in part on the request, the capability information; means for configuring the user equipment to perform the wireless sensing operation based at least in part on the capability information; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

A wireless communication device may perform a wireless sensing operation, for example, to support imaging of an environment associated with the wireless communication device. For example, higher frequency bands (e.g., millimeter wave (mmW or mmWave) bands, terahertz (THz) bands, and/or the like) may provide a high bandwidth and a large aperture for the determination of accurate range information, Doppler information, angle information, and/or the like, in comparison to lower frequency bands. A wireless sensing operation may include transmission of a waveform by a transmission component of a wireless communication device, sensing of reflected signals by a reception component of the wireless communication device, signal processing to correlate transmitted signals with received signals, and processing to identify an object, action, and/or the like. Wireless sensing may be useful for industrial Internet of Things (IoT), augmented reality, virtual reality, automotive applications, gaming applications, touchless interaction, and/or the like. Wireless sensing can be performed on the downlink (e.g., access point based radar sensing to determine a person's motions or actions) and on the uplink (e.g., UE based proximity sensing for user/machine interaction or awareness of other information).

Certain challenges may arise in wireless sensing operations. As one example, a wireless sensing operation may involve switching or tuning between a radio frequency (RF) configuration associated with the wireless sensing operation and an RF configuration associated with communication of the wireless communication device. Different wireless communication devices may be capable of switching on different time scales. For example, a less sophisticated wireless communication device may only be capable of switching on a slot level or even a super-slot level of granularity, whereas a more sophisticated wireless communication device may be capable of switching on a symbol level. Furthermore, as a subcarrier spacing becomes wider, a corresponding slot length may become shorter. Therefore, different UEs may be capable of wireless sensing operations at different minimum time scales and different bandwidths. Similarly, wireless communication device capabilities may differ with regard to sensing granularity levels (e.g., a resolution at which a wireless communication device can determine distance, velocity, or angle), a range of a wireless sensing operation, a bandwidth usable for a sensing operation, a power control level associated with a wireless sensing operation, one or more hardware constraints associated with a wireless sensing operation, and/or the like. Since a base station may rely on a UE's wireless sensing operation to perform certain network tasks, an inaccurate understanding of the UE's wireless sensing capabilities may lead to wasted resources of the UE in being configured to perform a wireless sensing operation that the UE is incapable of performing, and wasted resources of the base station in sub-optimally or erroneously configuring a UE to perform wireless sensing operations that are outside of or poorly suited for the capabilities of the UE.

Some techniques and apparatuses described herein provide capability signaling in connection with a wireless sensing operation. For example, some techniques and apparatuses described herein provide for a network entity (e.g., a BS 110 and/or the like) to request capability information associated with a wireless sensing operation, and for a UE (or another form of wireless communication device) to provide the capability information associated with the wireless sensing operation. The capability information may identify, for example, whether the UE is capable of the wireless sensing operation, a sensing mode associated with time division duplexing (TDD) multiplexing for the wireless sensing operation, a waveform for a signal associated with the wireless sensing operation, a sensing granularity associated with the wireless sensing operation, a range associated with the wireless sensing operation, a sensing bandwidth associated with the wireless sensing operation, a power control parameter associated with the wireless sensing operation, or a hardware constraint associated with the wireless sensing operation. In some aspects, the base station may configure the UE to perform a wireless sensing operation based at least in part on the capability information. In this way, a UE can inform a base station of wireless sensing capabilities of the UE, which enables improved utilization of wireless sensing resources and reduces the likelihood of incompatibility between a UE's wireless sensing capability and a configured wireless sensing operation.

Figure 3:
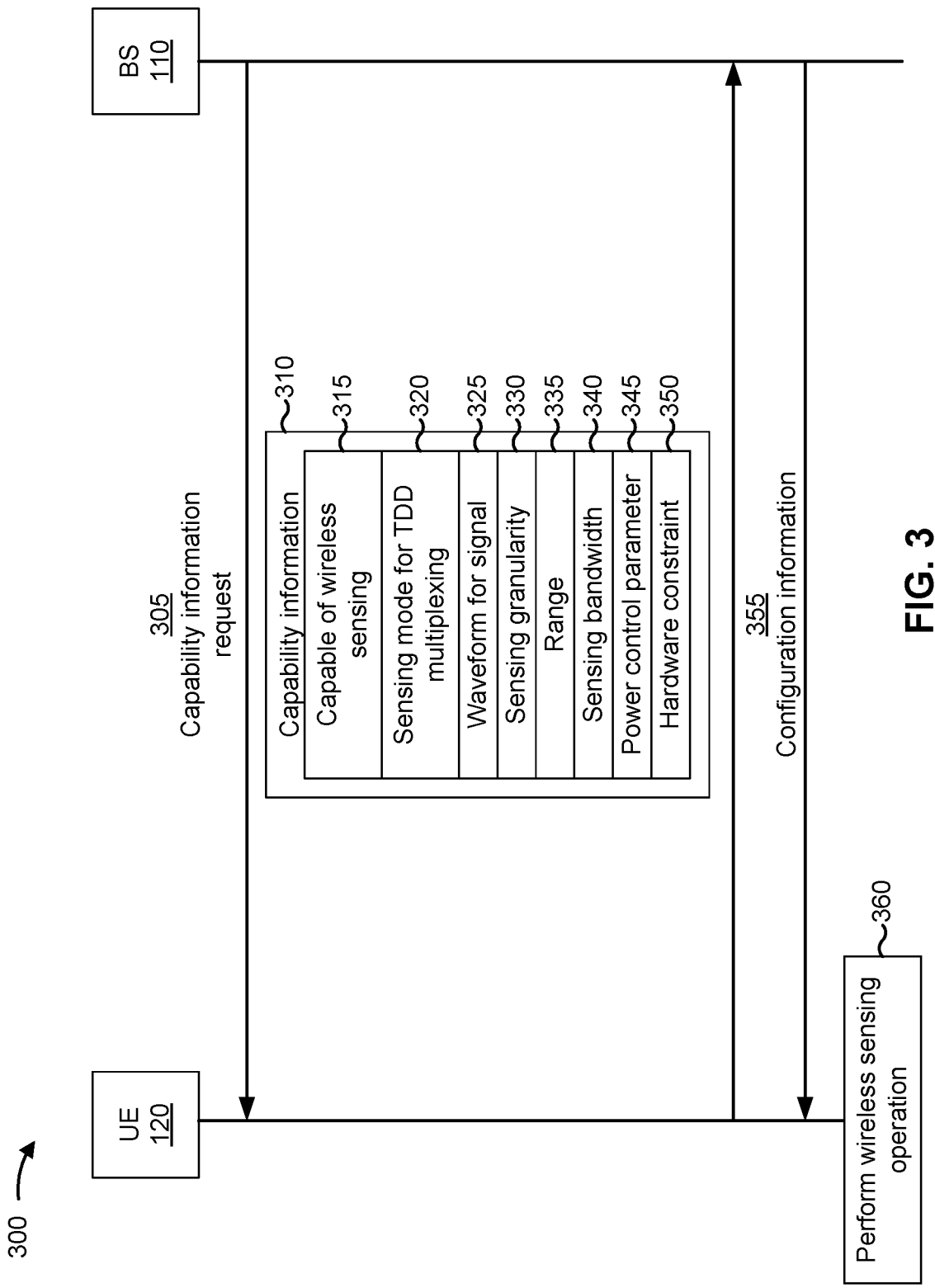
FIG. 3 is a diagram illustrating an example of signaling associated with a UE capability for a wireless sensing operation, in accordance with various aspects of the present disclosure.

FIG. 3 is a diagram illustrating an example 300 of signaling associated with a UE capability for a wireless sensing operation, in accordance with various aspects of the present disclosure. As shown, example 300 includes a UE 120 and a BS 110. While the operations described herein are primarily described as being performed by a UE and a corresponding BS, these operations can be performed by any wireless device and any corresponding network entity.

As shown by reference number 305, the BS 110 may provide, to the UE 120, a request for capability information associated with a wireless sensing operation. For example, the BS 110 may provide the request using radio resource control (RRC) signaling, a medium access control (MAC) control element (CE), downlink control information (DCI), a broadcast message, and/or the like. The request for capability information may indicate that the UE 120 is to transmit capability information that indicates one or more capabilities of the UE 120, relating to a wireless communication operation, to the BS 110. In some aspects, the request for capability information may indicate one or more particular capabilities for which the UE 120 is to provide capability information. In some aspects, the request for capability information may indicate that the UE 120 is to provide capability information for all capabilities of the UE 120 related to the wireless sensing operation.

As shown by reference number 310, the UE 120 may provide capability information associated with a wireless sensing operation. For example, the UE 120 may provide the capability information via RRC signaling, a MAC-CE, control information, and/or the like. Reference numbers 315 through 350 show capabilities that can be indicated in the capability information. In some aspects, the capability information may indicate all of the capabilities shown by reference numbers 315 through 350. In some aspects, the capability information may indicate a subset of the capabilities shown by reference numbers 315 through 350. For example, the capability information may indicate capabilities requested by the BS 110, capabilities of which the UE 120 is capable, and/or the like. The capabilities are described in turn below.

As shown by reference number 315, in some aspects, the capability information may indicate whether the UE 120 is capable of a wireless sensing operation. For example, the capability information may include a bit indicating whether the UE 120 is capable of the wireless sensing operation. In some aspects, the capability information may include multiple bits indicating, for example, a level of wireless sensing operation of which the UE 120 is capable. For example, a first set of bits may indicate a first level (e.g., a lowest-complexity or lowest-level wireless sensing operation), a second set of bits may indicate a second level (e.g., a wireless sensing operation that is more complex or higher-level than the first level), and so on.

As shown by reference number 320, in some aspects, the capability information may indicate a sensing mode associated with TDD multiplexing for the wireless sensing operation. For example, the wireless sensing operation may be TDD multiplexed with a communication of the UE 120, in that the UE 120 may switch between a frequency and/or configuration associated with the wireless sensing operation and a frequency and/or configuration associated with the communication. Different UEs may be associated with different capabilities with regard to TDD multiplexing of wireless sensing operations and communications. The capability information may indicate one or more sensing modes corresponding to one or more TDD multiplexing configurations that the UE 120 is capable of performing for a wireless sensing operation. Examples are provided in FIGS. 4 and 5.

Figure 4:
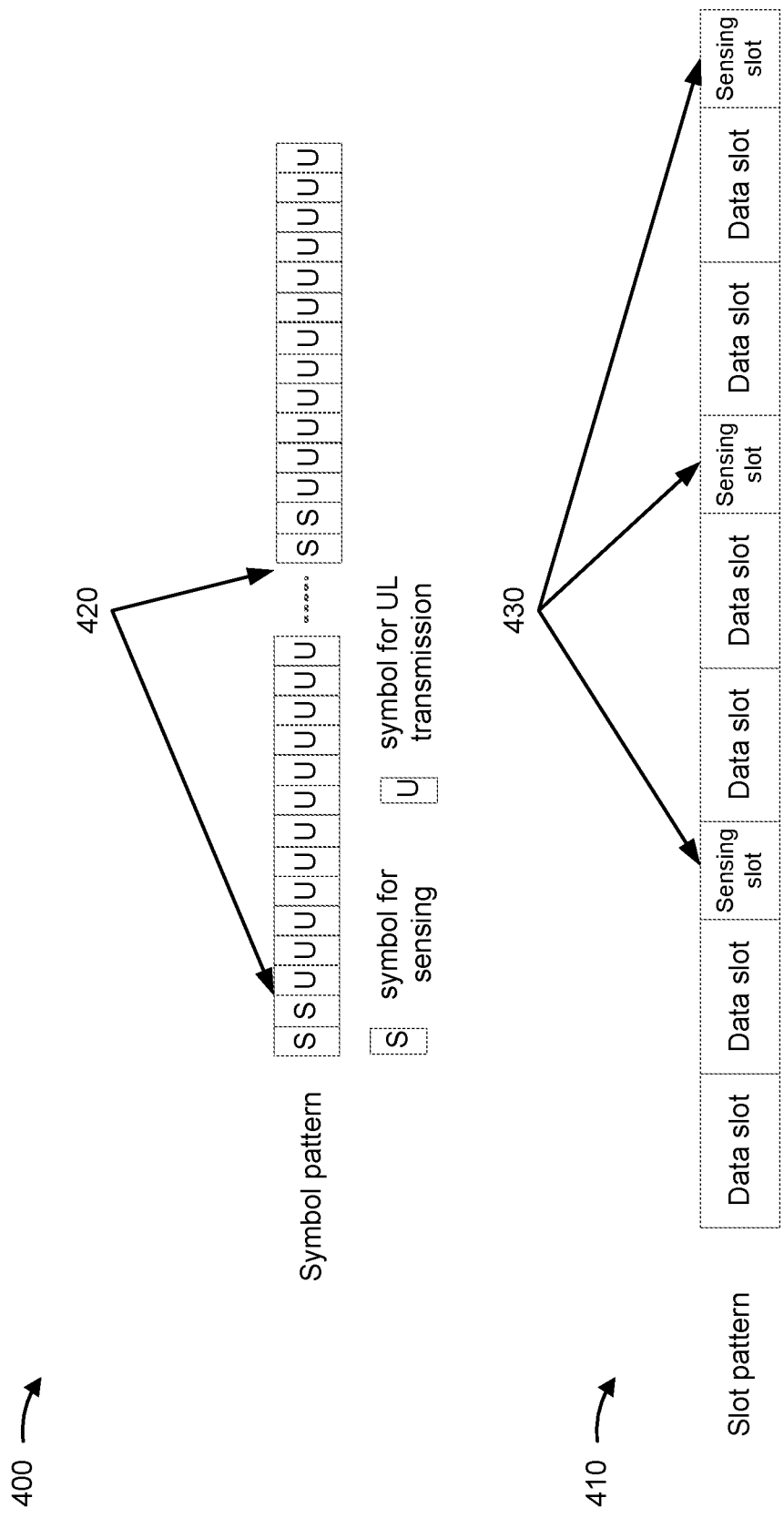
FIG. 4 is a diagram illustrating an example of a symbol-level sensing mode and an example of a slot-level sensing mode for a wireless sensing operation, in accordance with various aspects of the present disclosure.

FIG. 4 is a diagram illustrating an example 400 of a symbol-level sensing mode and an example 410 of a slot-level sensing mode for a wireless sensing operation, in accordance with various aspects of the present disclosure. As shown in the example 400, if the UE 120 is associated with a symbol-level sensing mode (corresponding to a symbol-granularity TDD multiplexing capability), the UE 120 may perform symbol-level tuning between symbols associated with a wireless sensing operation (shown by an "S" and by reference number 420) and symbols associated with an uplink transmission of the UE 120 (shown by a "U"). The example 400 may be useful for high-capability UEs, and may improve data throughput and reduce latency relative to other sensing modes. As shown in the example 410, the UE 120 is associated with a slot-level sensing mode (corresponding to a slot-granularity TDD multiplexing capability), and the UE 120 may perform slot-level tuning between a frequency associated with a wireless sensing operation (shown by "Sensing slot" and by reference number 430) and a frequency associated with an uplink transmission of the UE 120 (shown by "Data slot"). The example 410 may be useful for moderate-capability UEs, and may provide higher throughput and less interruption of communications than a sensing mode associated with a longer granularity while consuming less resources than a slot-level sensing mode.

Figure 5:
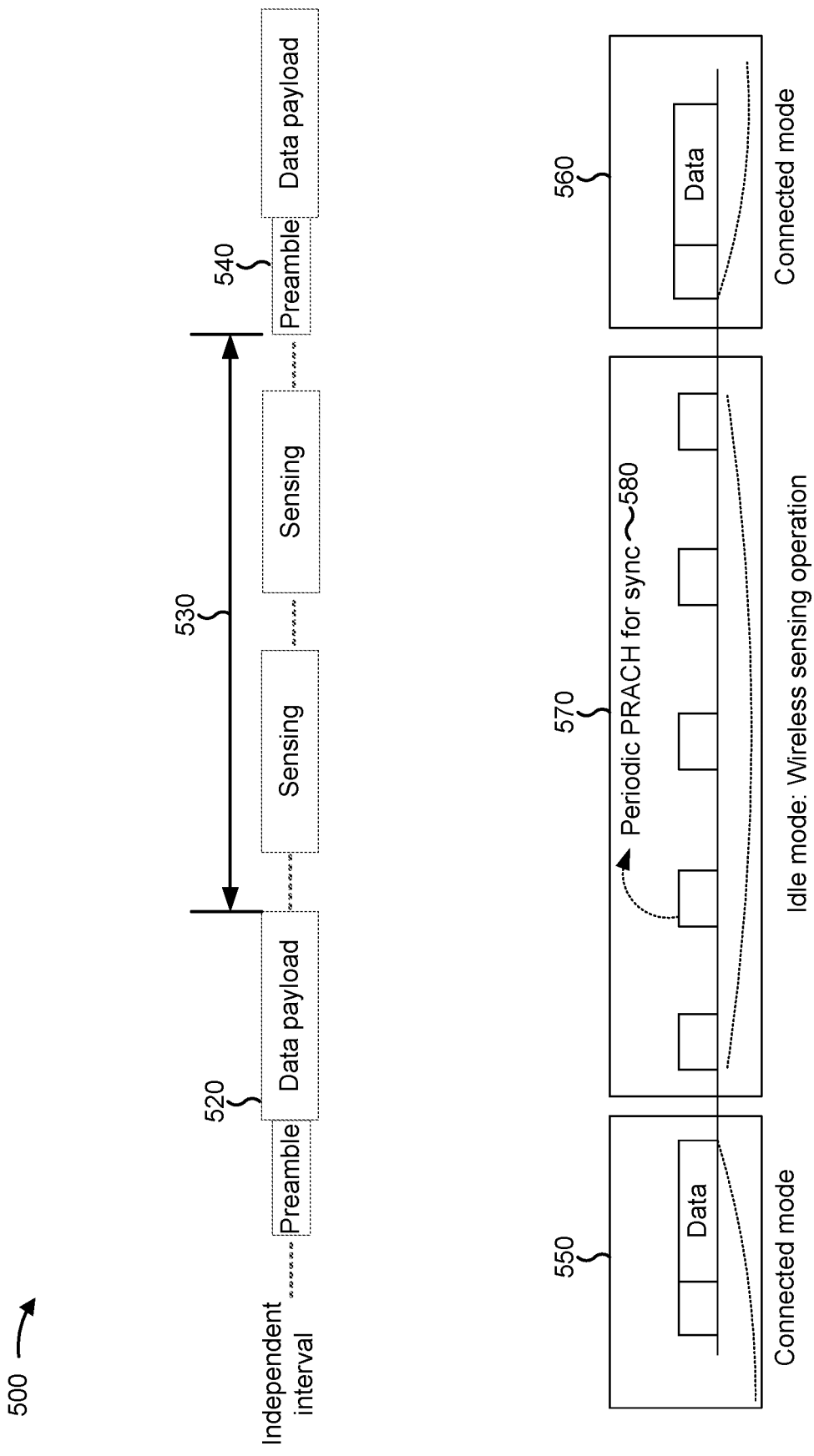
FIG. 5 is a diagram illustrating an example of a sensing mode for a wireless sensing operation that is independent of a symbol or slot structure, and an example of a sensing mode for a wireless sensing operation that is based at least in part on a discontinuous reception cycle of a UE, in accordance with various aspects of the present disclosure.

FIG. 5 is a diagram illustrating an example 500 of a sensing mode for a wireless sensing operation that is independent of a symbol or slot structure, and an example 510 of a sensing mode for a wireless sensing operation that is based at least in part on a discontinuous reception cycle of a UE, in accordance with various aspects of the present disclosure. In the example 500, the UE 120 transmits a preamble and a data payload 520, then performs the wireless sensing operation during a time period 530, then switches to transmitting a preamble and a data payload 540. In the example 510, the UE 120 may perform data communications during a discontinuous reception connected mode 550/560. Thus, the sensing mode in example 500 may be configured independently of a symbol or slot structure of the UE 120, leading to increased flexibility of wireless sensing and conserving communication resources of the UE 120, which may be useful for low-capability UEs. As shown by reference number 570, the UE 120 may perform a wireless sensing operation during a discontinuous reception idle mode or a discontinuous reception inactive mode. In some aspects, the UE 120 may perform periodic physical random access channel (PRACH) operation to synchronize with the BS 110, as shown by reference number 580. The sensing mode in example 510 may reduce interruption to data communications of the UE 120, thereby increasing throughput.

Figure 6:
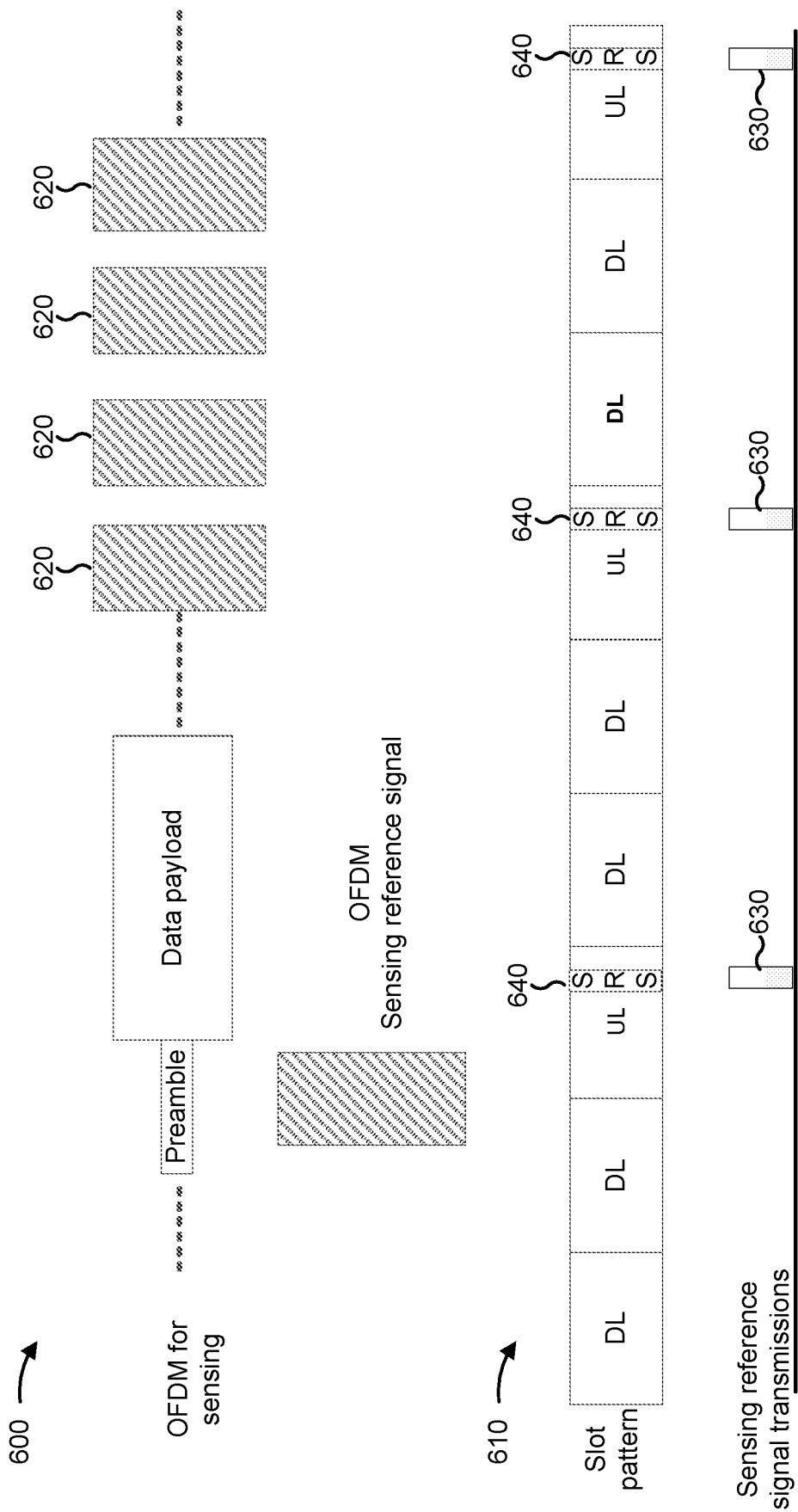
FIG. 6 is a diagram illustrating an example of orthogonal frequency division multiplexing waveforms for a sensing reference signal, in accordance with various aspects of the present disclosure.
Figure 7:
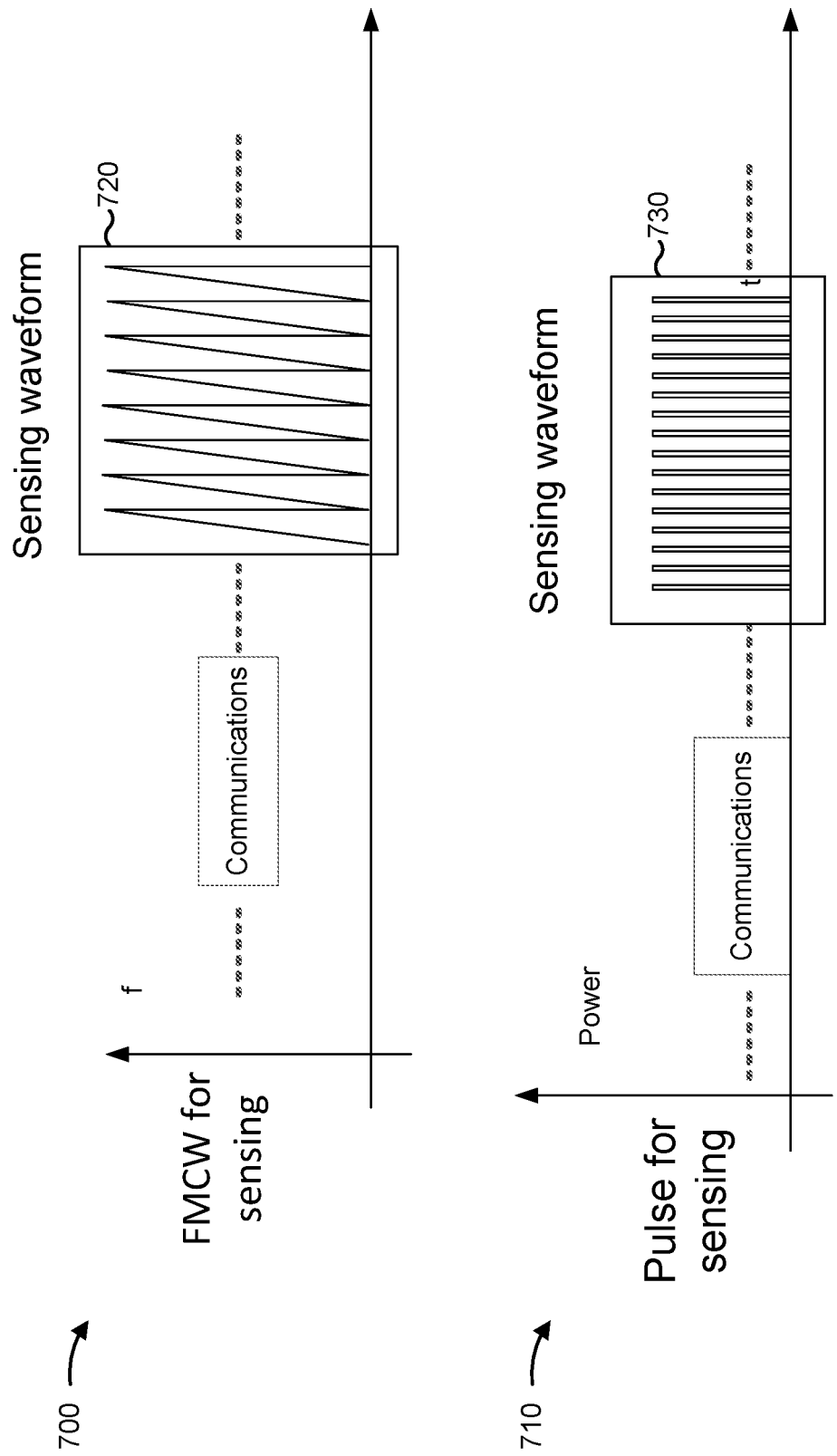
FIG. 7 is a diagram illustrating example waveforms for a sensing reference signal, in accordance with various aspects of the present disclosure.

Returning to FIG. 3, and as shown by reference number 325, in some aspects, the capability information may indicate a waveform for a signal associated with the wireless sensing operation. For example, the capability information may indicate one or more waveforms that the UE 120 is capable of using to transmit a sensing reference signal. FIGS. 6 and 7 show examples of waveforms for a sensing reference signal.

FIG. 6 is a diagram illustrating examples 600 and 610 of orthogonal frequency division multiplexing (OFDM) waveforms for a sensing reference signal, in accordance with various aspects of the present disclosure. As shown by reference number 620, in some aspects, the UE 120 may transmit a sensing reference signal using an OFDM waveform (indicated by the diagonal fill used for the sensing reference signals). In this case, the capability information may indicate that the UE 120 is capable of transmitting the sensing reference signal using the OFDM waveform. As shown by reference number 630, in some aspects, the UE 120 may transmit a sensing reference signal using the waveform of another reference signal. For example, the UE 120 may use an OFDM waveform for a sounding reference signal 640 to transmit the sensing reference signal. As another example, the UE 120 may use the sounding reference signal 640 as the sensing reference signal. In these cases, the capability information may indicate that the UE 120 is capable of transmitting the sensing reference signal using the waveform of the other reference signal, and/or may indicate the other reference signal.

FIG. 7 is a diagram illustrating example waveforms 700 and 710 for a sensing reference signal, in accordance with various aspects of the present disclosure. Example 700 shows an example where a sensing reference signal 720 is transmitted using a frequency modulated continuous wave (FMCW) waveform, and example 710 shows an example where a sensing reference signal 730 is transmitted using a pulse waveform. If the UE 120 supports the FMCW waveform of example 700, the UE 120 may transmit capability information indicating that the UE 120 supports the FMCW waveform. If the UE 120 supports the pulse waveform of example 710, the UE 120 may transmit capability information indicating that the UE 120 supports the pulse waveform. In some aspects, the capability information may indicate a combination of one or more of the above-described waveforms and/or one or more other waveforms not described above as supported by the UE 120. Additionally, or alternatively, the capability information may indicate one or more parameters associated with one or more waveforms supported by the UE 120, such as a pulse periodicity and/or the like.

Returning to FIG. 3, and as shown by reference number 330, in some aspects, the capability information may indicate a sensing granularity associated with the wireless sensing operation. For example, the capability information may indicate a sensing granularity associated with the wireless sensing operation. The sensing granularity level may indicate a granularity in terms of distance, a granularity in terms of Doppler value (e.g., velocity), a granularity in terms of angle (e.g., elevation angle, azimuth angle, and/or the like), or a combination thereof. For example, the sensing granularity level may indicate a resolution value that identifies a minimum resolution in one or more of the above dimensions. As one example, the sensing granularity may indicate a distance granularity of 4 cm, a Doppler granularity of 2 cm/s, and an angular granularity of 5 degrees. In some aspects, the capability information may indicate a sensing granularity by reference to a table. For example, an index of the capability information may indicate a sensing granularity value defined by the table. As one example, if a table includes values [0.1, 1, 5, 10, 20, 50, 100] cm for a distance granularity, and if the UE 120 supports a distance granularity between 5 and 10 cm, then the UE 120 may report an index of 3 for the capability relating to the distance granularity. Such a table may include quantized values, real (e.g., unquantized) values, and/or the like. In some aspects, the UE 120 may report a quantized value for a granularity, which may reduce overhead associated with configuring the table, but which may increase signaling overhead relative to indicating an index associated with the table. As one example, if the UE 120 supports a distance granularity of 7.2 cm, the UE 120 may transmit a quantized value of 0111 (e.g., 7 in base 2) using 4 bits corresponding to a value of 7.

As shown by reference number 335, in some aspects, the capability information may indicate a range associated with the wireless sensing operation. For example, the UE 120 may transmit information indicating a capability for a range of values for which the UE 120 can determine wireless sensing information. In some aspects, the capability information may indicate a range based at least in part on a table, such as the table shown in FIG. 8. FIG. 8 is a diagram illustrating an example of a table 800 indicating values for a wireless sensing capability relating to a range for a wireless sensing operation, in accordance with various aspects of the present disclosure. As shown, each row of the table 800 may correspond to a respective dimension for a wireless sensing operation. A range may indicate a range of values (e.g., a range of distances, a range of velocities, an angular range, and/or the like) for which the UE 120 is capable of performing a wireless sensing operation. The UE 120 may transmit capability information including an index corresponding to a column of the table that includes a set of values corresponding to capabilities of the UE 120. Thus, the UE 120 may conserve signaling resources that would otherwise be used to individually indicate the ranges shown in table 800. In some aspects, ranges for the various dimensions of the wireless sensing operation may be associated with respective tables (e.g., one or more dimensions per table), and the UE 120 may provide indexes corresponding to the respective tables. This may provide more flexibility than a single-table approach, while the single-table approach may involve reduced overhead associated with the capability report.

Returning to FIG. 3, and as shown by reference number 340, in some aspects, the capability information may indicate a sensing bandwidth associated with the wireless sensing operation. In some aspects, the capability information may indicate a maximum bandwidth for a sensing reference signal associated with the wireless sensing operation. For example, the maximum bandwidth may be related to a hardware capability of the UE 120 (e.g., a radio frequency bandwidth configuration and/or the like). In some aspects, the capability information may indicate additional bandwidth for a wireless sensing operation, such as additional bandwidth associated with a carrier aggregation configuration of the UE 120 (e.g., so that a maximum bandwidth of a band of the UE 120 can be exceeded) and/or the like. In some aspects, the capability information may indicate a minimum bandwidth for a wireless sensing operation. For example, the minimum bandwidth may be related to a distance resolution for the wireless sensing operation, and some wireless sensing operations may be configured based at least in part on the minimum bandwidth for range resolution.

As shown by reference number 345, in some aspects, the capability information may indicate a power control parameter associated with the wireless sensing operation. For example, the capability information may indicate whether power control for the wireless sensing operation is handled by the UE 120 (e.g., based at least in part on a UE implementation). As another example, the capability information may indicate whether power control for the wireless sensing operation is assisted by the BS 110 (e.g., based at least in part on a power control loop by the BS 110). As yet another example, the capability information may indicate a maximum power that can be used by the UE 120 for the wireless sensing operation.

As shown by reference number 350, in some aspects, the capability information may indicate a hardware constraint associated with the wireless sensing operation. For example, the capability information may indicate an antenna configuration for the wireless sensing operation. In this case, the capability information may indicate whether the UE 120 is associated with one or more dedicated antennas for the wireless sensing operation, or whether one or more antennas for the wireless sensing operation are shared for communication purposes during the wireless sensing operation. As another example, the capability information may indicate an antenna array size or an angular resolution based at least in part on the antenna array size. In some aspects, the capability information may indicate a radio frequency configuration for the wireless sensing operation. For example, the capability information may indicate whether the UE 120 uses a full-duplex mode or a half-duplex mode for the wireless sensing operation. As another example, the capability information may indicate whether the UE 120 supports the full-duplex mode for the wireless sensing operation.

As shown by reference number 355, the BS 110 may transmit configuration information to the UE 120. The configuration information may configure a wireless sensing operation in accordance with the capability information. As shown by reference number 360, the UE 120 may perform the wireless sensing operation in accordance with the configuration information. In some aspects, the UE 120 may perform the wireless sensing operation without having received the configuration information (e.g., the UE 120 may have already been configured to perform the wireless sensing operation). In this way, the UE 120 provides capability information for a wireless sensing operation to the BS 110, and the BS 110 configures a wireless sensing operation for the UE 120 based at least in part on the capability information. Thus, resource consumption is reduced in connection with poorly optimized or inefficient wireless sensing configuration.

As indicated above, FIGS. 3-8 are provided as one or more examples. Other examples may differ from what is provided with regard to FIGS. 3-8.

Figure 9:
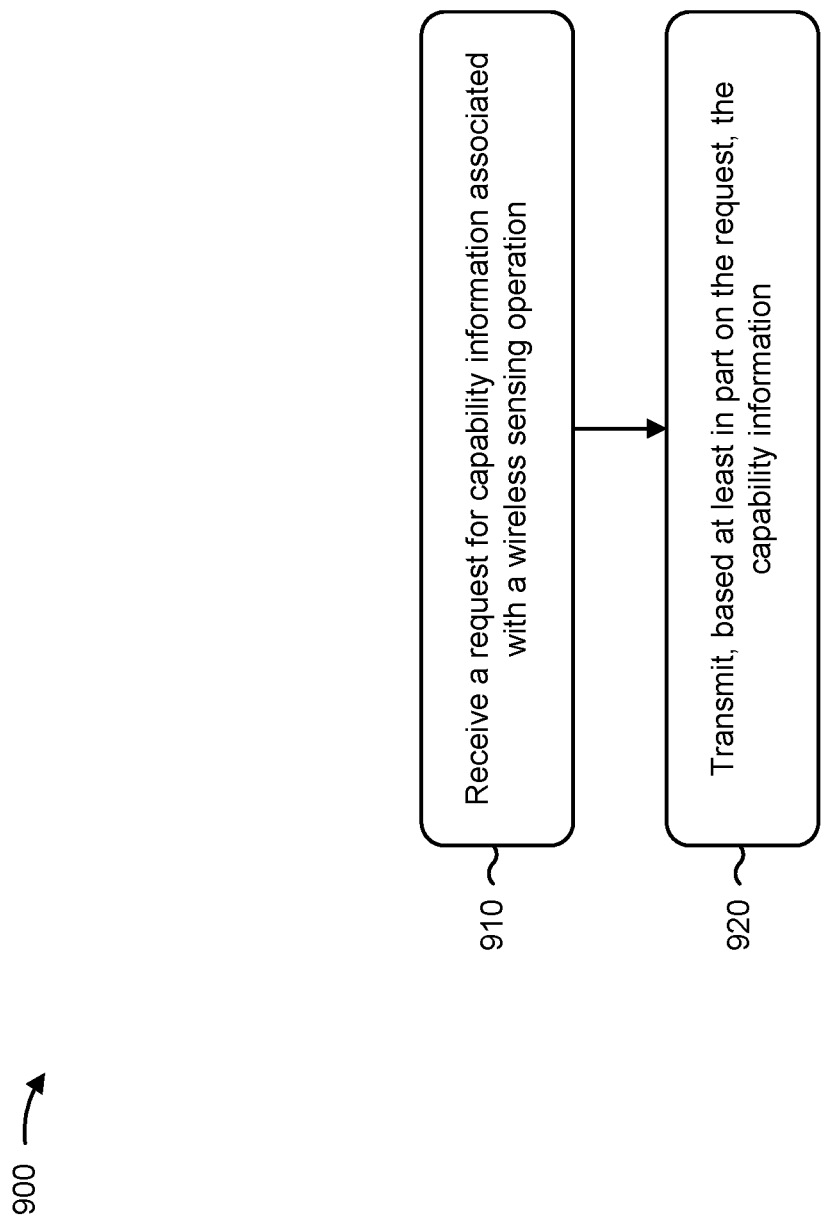

FIG. 9 is a diagram illustrating an example process 900 performed, for example, by a UE, in accordance with various aspects of the present disclosure. Example process 900 is an example where the UE (e.g., UE 120 and/or the like) performs operations associated with signaling capability information for a wireless sensing operation.

As shown in FIG. 9, in some aspects, process 900 may include receiving a request for capability information associated with a wireless sensing operation (block 910). For example, the UE (e.g., using antenna 252, DEMOD 254, MIMO detector 256, receive processor 258, controller/processor 280, and/or the like) may receive a request for capability information associated with a wireless sensing operation, as described above. The capability information may identify at least one of: whether the user equipment is capable of the wireless sensing operation, a sensing mode associated with TDD multiplexing for the wireless sensing operation, a waveform for a signal associated with the wireless sensing operation, a sensing granularity associated with the wireless sensing operation, a range associated with the wireless sensing operation, a sensing bandwidth associated with the wireless sensing operation, a power control parameter associated with the wireless sensing operation, or a hardware constraint associated with the wireless sensing operation, as described above.

As further shown in FIG. 9, in some aspects, process 900 may include transmitting, based at least in part on the request, the capability information (block 920). For example, the UE (e.g., using controller/processor 280, transmit processor 264, TX MIMO processor 266, MOD 254, antenna 252, and/or the like) may transmit, based at least in part on the request, the capability information, as described above.

Process 900 may include additional aspects, such as any single aspect or any combination of aspects described below and/or in connection with one or more other processes described elsewhere herein.

In a first aspect, process 900 includes performing the wireless sensing operation based at least in part on the capability information.

In a second aspect, alone or in combination with the first aspect, the sensing mode is based at least in part on a capability of the user equipment associated with switching between a sensing configuration and a communication configuration.

In a third aspect, alone or in combination with one or more of the first and second aspects, the capability information indicates that the TDD multiplexing is performed based at least in part on one or more of: a symbol-level granularity, a slot-level granularity, a configured granularity independent of timing associated with the communication configuration, a discontinuous reception configuration of the user equipment, or a combination thereof.

In a fourth aspect, alone or in combination with one or more of the first through third aspects, the waveform includes at least one of: an OFDM waveform, an OFDM waveform for a reference signal symbol, a frequency modulated continuous wave waveform, a pulse-based waveform, or a combination thereof.

In a fifth aspect, alone or in combination with one or more of the first through fourth aspects, the sensing granularity is defined as one or more of: a distance value, a velocity value, an angular value, or a combination thereof.

In a sixth aspect, alone or in combination with one or more of the first through fifth aspects, the sensing granularity is defined by reference to a table entry.

In a seventh aspect, alone or in combination with one or more of the first through sixth aspects, the capability information indicates a quantization of the sensing granularity.

In an eighth aspect, alone or in combination with one or more of the first through seventh aspects, the range is defined as one or more of: a distance value, a velocity value, an angular value, or a combination thereof.

In a ninth aspect, alone or in combination with one or more of the first through eighth aspects, the range is defined by reference to a table entry.

In a tenth aspect, alone or in combination with one or more of the first through ninth aspects, the capability information indicates a maximum sensing bandwidth based at least in part on a hardware configuration of the user equipment.

In an eleventh aspect, alone or in combination with one or more of the first through tenth aspects, the sensing bandwidth indicates whether the wireless sensing operation is associated with a wideband configuration.

In a twelfth aspect, alone or in combination with one or more of the first through eleventh aspects, the capability information indicates a minimum sensing bandwidth for the wireless sensing operation.

In a thirteenth aspect, alone or in combination with one or more of the first through twelfth aspects, the power control parameter indicates whether power control for the wireless sensing operation is assisted by a base station.

In a fourteenth aspect, alone or in combination with one or more of the first through thirteenth aspects, the power control parameter indicates a maximum power level associated with the wireless sensing operation.

In a fifteenth aspect, alone or in combination with one or more of the first through fourteenth aspects, the hardware constraint indicates an antenna configuration for the wireless sensing operation.

In a sixteenth aspect, alone or in combination with one or more of the first through fifteenth aspects, the hardware constraint indicates whether the wireless sensing operation is associated with a full-duplex radio frequency configuration or a half-duplex radio frequency configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a base station, in accordance with various aspects of the present disclosure. Example process 1000 is an example where the base station (e.g., BS 110 and/or the like) performs operations associated with signaling capability information for a wireless sensing operation.

As shown in FIG. 10, in some aspects, process 1000 may include transmitting, to a user equipment, a request for capability information associated with a wireless sensing operation (block 1010). For example, the base station (e.g., using controller/processor 240, transmit processor 220, TX MIMO processor 230, MOD 232, antenna 234, and/or the like) may transmit, to a user equipment, a request for capability information associated with a wireless sensing operation, as described above. The capability information may identify at least one of: whether the user equipment is capable of the wireless sensing operation, a sensing mode associated with TDD multiplexing for the wireless sensing operation, a waveform for a signal associated with the wireless sensing operation, a sensing granularity associated with the wireless sensing operation, a range associated with the wireless sensing operation, a sensing bandwidth associated with the wireless sensing operation, a power control parameter associated with the wireless sensing operation, or a hardware constraint associated with the wireless sensing operation As further shown in FIG. 10, in some aspects, process 1000 may include receiving, based at least in part on the request, the capability information (block 1020). For example, the base station (e.g., using antenna 234, DEMOD 232, MIMO detector 236, receive processor 238, controller/processor 240, and/or the like) may receive, based at least in part on the request, the capability information, as described above.

Process 1000 may include additional aspects, such as any single aspect or any combination of aspects described below and/or in connection with one or more other processes described elsewhere herein.

In a first aspect, process 1000 includes configuring the user equipment to perform the wireless sensing operation based at least in part on the capability information.

In a second aspect, alone or in combination with the first aspect, the sensing mode is based at least in part on a capability of the user equipment associated with switching between a sensing configuration and a communication configuration.

In a third aspect, alone or in combination with one or more of the first and second aspects, the capability information indicates that the TDD multiplexing is performed based at least in part on one or more of: a symbol-level granularity, a slot-level granularity, a configured granularity independent of timing associated with the communication configuration, a discontinuous reception configuration of the user equipment, or a combination thereof.

In a fourth aspect, alone or in combination with one or more of the first through third aspects, the waveform includes at least one of: an OFDM waveform, an OFDM waveform for a reference signal symbol, a frequency modulated continuous wave waveform, a pulse-based waveform, or a combination thereof.

In a fifth aspect, alone or in combination with one or more of the first through fourth aspects, the sensing granularity is defined as one or more of: a distance value, a velocity value, an angular value, or a combination thereof.

In a sixth aspect, alone or in combination with one or more of the first through fifth aspects, the sensing granularity is defined by reference to a table entry.

In a seventh aspect, alone or in combination with one or more of the first through sixth aspects, the capability information indicates a quantization of the sensing granularity.

In an eighth aspect, alone or in combination with one or more of the first through seventh aspects, the range is defined as one or more of: a distance value, a velocity value, an angular value, or a combination thereof.

In a ninth aspect, alone or in combination with one or more of the first through eighth aspects, the range is defined by reference to a table entry.

In a tenth aspect, alone or in combination with one or more of the first through ninth aspects, the capability information indicates a maximum sensing bandwidth based at least in part on a hardware configuration of the user equipment.

In an eleventh aspect, alone or in combination with one or more of the first through tenth aspects, the sensing bandwidth indicates whether the wireless sensing operation is associated with a wideband configuration.

In a twelfth aspect, alone or in combination with one or more of the first through eleventh aspects, the capability information indicates a minimum sensing bandwidth for the wireless sensing operation.

In a thirteenth aspect, alone or in combination with one or more of the first through twelfth aspects, the power control parameter indicates whether power control for the wireless sensing operation is assisted by the base station.

In a fourteenth aspect, alone or in combination with one or more of the first through thirteenth aspects, the power control parameter indicates a maximum power level associated with the wireless sensing operation.

In a fifteenth aspect, alone or in combination with one or more of the first through fourteenth aspects, the hardware constraint indicates an antenna configuration for the wireless sensing operation.

In a sixteenth aspect, alone or in combination with one or more of the first through fifteenth aspects, the hardware constraint indicates whether the wireless sensing operation is associated with a full-duplex radio frequency configuration or a half-duplex radio frequency configuration.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment for wireless communication, comprising:
    a memory; and
    one or more processors operatively coupled to the memory, the one or more processors configured to:
        receive, by the user equipment, a request for capability information associated with a wireless sensing operation, the capability information identifying at least one of:
        whether the user equipment is capable of the wireless sensing operation,
        a sensing mode associated with time division duplexing (TDD) multiplexing for the wireless sensing operation,
        a waveform for a signal associated with the wireless sensing operation,
        a sensing granularity associated with the wireless sensing operation,
        a range associated with the wireless sensing operation,
        a sensing bandwidth associated with the wireless sensing operation,
        a power control parameter associated with the wireless sensing operation, or
        a hardware constraint associated with the wireless sensing operation; and
        transmit, based at least in part on the request, the capability information.

2. The user equipment of claim 1, wherein the one or more processors are further configured to:
    perform the wireless sensing operation based at least in part on the capability information.

3. The user equipment of claim 1, wherein the sensing mode is based at least in part on a capability of the user equipment associated with switching between a sensing configuration and a communication configuration.

4. The user equipment of claim 3, wherein the capability information indicates that the TDD multiplexing is performed based at least in part on one or more of:
   a symbol-level granularity,
   a slot-level granularity,
   a configured granularity independent of timing associated with the communication configuration,
   a discontinuous reception configuration of the user equipment, or
   a combination thereof.

5. The user equipment of claim 1, wherein the waveform includes at least one of:
   an orthogonal frequency division multiplexing (OFDM) waveform,
   an OFDM waveform for a reference signal symbol,
   a frequency modulated continuous wave waveform,
   a pulse-based waveform, or
   a combination thereof.

6. The user equipment of claim 1, wherein the sensing granularity is defined as one or more of:
   a distance value,
   a velocity value,
   an angular value, or
   a combination thereof.

7. The user equipment of claim 1, wherein the sensing granularity is defined by reference to a table entry.

8. The user equipment of claim 1, wherein the capability information indicates a quantization of the sensing granularity.

9. The user equipment of claim 1, wherein the range is defined as one or more of:
   a distance value,
   a velocity value,
   an angular value, or
   a combination thereof.

10. The user equipment of claim 1, wherein the range is defined by reference to a table entry.

11. The user equipment of claim 1, wherein the capability information indicates a maximum sensing bandwidth based at least in part on a hardware configuration of the user equipment, or a minimum sensing bandwidth for the wireless sensing operation.

12. The user equipment of claim 1, wherein the sensing bandwidth indicates whether the wireless sensing operation is associated with a wideband configuration.

13. The user equipment of claim 1, wherein the power control parameter indicates whether power control for the wireless sensing operation is assisted by a base station, or a maximum power level associated with the wireless sensing operation.

14. The user equipment of claim 1, wherein the hardware constraint indicates an antenna configuration for the wireless sensing operation or whether the wireless sensing operation is associated with a full-duplex radio frequency configuration or a half-duplex radio frequency configuration.

15. A base station for wireless communication, comprising:
   a memory; and
   one or more processors operatively coupled to the memory, the one or more processors configured to:
      transmit, to a user equipment, a request for capability information associated with a wireless sensing operation, the capability information identifying at least one of:
         whether the user equipment is capable of the wireless sensing operation,
         a sensing mode associated with time division duplexing (TDD) multiplexing for the wireless sensing operation,
         a waveform for a signal associated with the wireless sensing operation,
         a sensing granularity associated with the wireless sensing operation,
         a range associated with the wireless sensing operation,
         a sensing bandwidth associated with the wireless sensing operation,
         a power control parameter associated with the wireless sensing operation, or
         a hardware constraint associated with the wireless sensing operation; and
      receive, based at least in part on the request, the capability information.

16. The base station of claim 15, wherein the one or more processors are further configured to:
   configure the user equipment to perform the wireless sensing operation based at least in part on the capability information.

17. The base station of claim 15, wherein the sensing mode is based at least in part on a capability of the user equipment associated with switching between a sensing configuration and a communication configuration.

18. The base station of claim 17, wherein the capability information indicates that the TDD multiplexing is performed based at least in part on one or more of:
   a symbol-level granularity,
   a slot-level granularity,
   a configured granularity independent of timing associated with the communication configuration,
   a discontinuous reception configuration of the user equipment, or
   a combination thereof.

19. The base station of claim 15, wherein the waveform includes at least one of:
   an orthogonal frequency division multiplexing (OFDM) waveform,
   an OFDM waveform for a reference signal symbol,
   a frequency modulated continuous wave waveform,
   a pulse-based waveform, or
   a combination thereof.

20. The base station of claim 15, wherein the sensing granularity is defined as one or more of:
   a distance value,
   a velocity value,
   an angular value, or
   a combination thereof.

21. The base station of claim 15, wherein the sensing granularity is defined by reference to a table entry.

22. The base station of claim 15, wherein the capability information indicates a quantization of the sensing granularity.

23. The base station of claim 15, wherein the range is defined as one or more of:
   a distance value,
   a velocity value,
   an angular value, or
   a combination thereof.

24. The base station of claim 15, wherein the range is defined by reference to a table entry.

25. The base station of claim 15, wherein the capability information indicates a maximum sensing bandwidth based at least in part on a hardware configuration of the user equipment, or a minimum sensing bandwidth for the wireless sensing operation.

26. The base station of claim 15, wherein the sensing bandwidth indicates whether the wireless sensing operation is associated with a wideband configuration.

27. The base station of claim 15, wherein the power control parameter indicates whether power control for the wireless sensing operation is assisted by the base station, or a maximum power level associated with the wireless sensing operation.

28. The base station of claim 15, wherein the hardware constraint indicates an antenna configuration for the wireless sensing operation, or whether the wireless sensing operation is associated with a full-duplex radio frequency configuration or a half-duplex radio frequency configuration.

29. A method of wireless communication performed by a user equipment, comprising:
  receiving, by the user equipment, a request for capability information associated with a wireless sensing operation, the capability information identifying at least one of:
    whether the user equipment is capable of the wireless sensing operation,
    a sensing mode associated with time division duplexing (TDD) multiplexing for the wireless sensing operation,
    a waveform for a signal associated with the wireless sensing operation,
    a sensing granularity associated with the wireless sensing operation,
    a range associated with the wireless sensing operation,
    a sensing bandwidth associated with the wireless sensing operation,
    a power control parameter associated with the wireless sensing operation, or
    a hardware constraint associated with the wireless sensing operation; and
  transmitting, based at least in part on the request, the capability information.

30. The method of claim 29, further comprising:
  performing the wireless sensing operation based at least in part on the capability information.

31. The method of claim 29, wherein the sensing mode is based at least in part on a capability of the user equipment associated with switching between a sensing configuration and a communication configuration.

32. A method of wireless communication performed by a base station, comprising:
  transmitting, to a user equipment, a request for capability information associated with a wireless sensing operation, the capability information identifying at least one of:
    whether the user equipment is capable of the wireless sensing operation,
    a sensing mode associated with time division duplexing (TDD) multiplexing for the wireless sensing operation,
    a waveform for a signal associated with the wireless sensing operation,
    a sensing granularity associated with the wireless sensing operation,
    a range associated with the wireless sensing operation,
    a sensing bandwidth associated with the wireless sensing operation,
    a power control parameter associated with the wireless sensing operation, or
    a hardware constraint associated with the wireless sensing operation; and
  receiving, based at least in part on the request, the capability information.

33. The method of claim 32, further comprising:
  configuring the user equipment to perform the wireless sensing operation based at least in part on the capability information.

34. The method of claim 32, wherein the sensing mode is based at least in part on a capability of the user equipment associated with switching between a sensing configuration and a communication configuration.

35. An apparatus for wireless communication, comprising:
  means for receiving, by the apparatus, a request for capability information associated with a wireless sensing operation, the capability information identifying at least one of:
    whether the apparatus is capable of the wireless sensing operation,
    a sensing mode associated with time division duplexing (TDD) multiplexing for the wireless sensing operation,
    a waveform for a signal associated with the wireless sensing operation,
    a sensing granularity associated with the wireless sensing operation,
    a range associated with the wireless sensing operation,
    a sensing bandwidth associated with the wireless sensing operation,
    a power control parameter associated with the wireless sensing operation, or
    a hardware constraint associated with the wireless sensing operation; and
  means for transmitting, based at least in part on the request, the capability information.

* * * * *